Patented Jan. 12, 1932

1,840,404

UNITED STATES PATENT OFFICE

CARL J. MALM, OF ROCHESTER, NEW YORK, ASSIGNOR TO EASTMAN KODAK COMPANY, OF ROCHESTER, NEW YORK, A CORPORATION OF NEW YORK

PROCESS FOR THE PRODUCTION OF CELLULOSE ACETATE FREE FROM HAZE

No Drawing. Application filed August 10, 1929. Serial No. 385,075.

This invention relates to process for producing cellulose acetate free from haze, and particularly to the production of cellulose acetate in an acetylating bath containng a mineral acid catalyst by such a process as will obviate the formation of haze in the intermediate or final product.

The usual method for the manufacture of cellulose acetate consists in treating cellulose obtained from cotton, jute, wood pulp or other material from which cellulose fibers may be obtained in a solution containing acetic anhydride, acetic acid and a suitable catalyst until the cellulose has been acetylated. The catalysts which have been used for this purpose are legion. Most experimenters have found, however, that the mineral acid catalysts such as hydrochloric, sulphuric or phosphoric acids have proved to be most suitable. In the operation of known processes for producing cellulose acetate upon a commercial scale, however, difficulty has been experienced due to the fact that the cellulose acetate produced is not entirely clear but has a somewhat hazy or opalescent appearance. While such an acetate has many commercial uses, such, for example, as in the lacquer or artificial silk industry in which the transparency of the resulting film is not of prime importance, this acetate must sometimes be given expensive subsequent treatment to free it from haze for it to be useful in the photographic industry in which a brilliant, clear and absolutely transparent cellulosic film is required in order that the silver image upon the film be as perfect as possible.

Considerable experimental work has been done to determine the cause of this haze formation. At first it was attributed to the unesterified fibres in the acetylating mass. Extensive filtering tests were therefore undertaken to separate the supposedly unacetylated fibres from the cellulose acetate and while in some instances the appearance of the resulting dope was improved, in others no apparent improvement resulted. A surprising result from some of these experiments was noted that the filtered dope was frequently more highly opalescent than that prior to filtration. Other methods were tried, such as an attempt to remove all impurities resulting from impure wash water; none of these experiments, however, were consistently successful. In spite of the inabilty of the above processes to consistently produce a clear dope several of them were commercially used with the resultant increase in expense of the final cellulose acetate produced.

The object of the present invention is to provide a process whereby cellulose acetate may be obtained which is free from haze. Other objects will hereinafter appear.

I have discovered, much to my surprise, that by conducting the pre-treatment, acetylation, and hydrolysis of cellulose acetate in a container composed primarily of chromium, nickel and iron that this haze can be entirely prevented in the final cellulose acetate product, as it appears that by conducting the acetylation in such a container none of the impurities which produce the haze are formed. After my discovery it was evident that the cause of the haze in the cellulose acetate dope was due to metallic salts dissolved by the ingredients in the acetylation bath from the metallic containers previously used in the art. A condition not before fully realized.

I likewise found that this advantageous effect was obtained even when powerful mineral acid catalysts such as sulphuric acid or a mixture of sulphuric and phosphoric acids were used in the acetylating solution. Acetylation reactions conducted in the usual type of containers such, for example, as copper, bronze or steel or even wooden containers in which there are metallic stirrers or cooling coils constructed of these metals, produce a cellulose acetate which is very hazy and apparently the amount of haze is in direct ratio to the concentration of the powerful mineral acid catalyst or mixed mineral acid catalyst which has been used. The simple expedient, therefore, of conducting these reactions in a container such as I have provided makes it possible to now use cellulose acetate products produced by known processes even in the photographic art.

As has hereinabove been stated, the use of mineral acid catalysts has usually entailed the necessity of further treatment of the cellulose acetate either by filtration or by other means to remove the haze which has been produced by such an acetylation processes. Moreover processes for removing the haze were not always entirely successful. My process, therefore, not only eliminates haze, but does it without requiring any subsequent treatment of the cellulose acetate by filtration in solution or by elaborate washing operations of the precipitated cellulose acetate.

I shall now give an example for the preparation of such a cellulose acetate, but it will be distinctly understood that I shall not be held strictly to the proportions of the materials therein given except as is indicated in the appended claims.

Fifty parts by weight of cellulose, say cotton linters which have been purified in the usual way, are mixed with 490 parts of glacial acetic acid containing 3½ parts of a mixed catalyst. The latter is composed of $2\frac{6}{10}$ths part by weight of phosphoric acid (95 per cent strength) and $\frac{9}{10}$ths parts of sulphuric acid (98 per cent strength). The pre-treatment mass thus obtained is kept at 38 degrees centigrade for approximately four hours. At the end of this pre-treatment the mass is lowered to a temperature of 15 degrees centigrade and 165 parts by weight of 85 per cent acetic anhydride is added. The temperature of the reaction is allowed to rise but not at any time above 42 degrees centigrade and after a period of approximately eight to fifteen hours a cellulose acetate is obtained which is chloroform soluble.

The hereinbefore described pre-treatment and acetylation processes will not produce an entirely clear dope when the reactions are conducted in the usual commercial apparatus. If they are conducted, however, in a vessel composed of approximately 18% chromium, 8% nickel and 74% iron, with, of course, some impurities such, for example, as silicon, carbon, manganese, sulphur, etc., and in which any stirrers, paddles, rods or pipes or other implements contacting with the pre-treatment and acetylation mixtures are composed of the same alloy, a cellulose acetate dope free from haze will result. The subsequent hydrolysis of the cellulose acetate from chloroform to acetone solubility, or to any other solubility which it is desired to produce should likewise be conducted in a vessel and with implements composed of the above described alloy or its equivalent, in order that a cellulose acetate which is entirely free from haze and which is therefore particularly suitable for many commercial purposes and for the manufacture of photographic film especially may be produced.

Various changes may be made in the manner of carrying out the esterification of cellulose acetate and in the type of mineral acid catalyst employed or in the proportions of the various elements in the composition of the metallic container or implements used within the knowledge of those skilled in the art, without in any way departing from the scope of this invention or sacrificing any of the advantages that may be derived therefrom.

What I claim as new and desire to secure by Letters Patent is:

1. A process for the production of cellulose acetate free from haze which comprises conducting the acetylating steps in a container and with implements at least those parts of which that contact with the acetylating solution being constructed solely of an alloy of chromium, nickel and iron.

2. A process for the production of cellulose acetate free from haze which comprises conducting the acetylating steps in the presence of a mineral acid catalyst, in a container and with implements at least those parts of which that contact with the acetylating solution being constructed solely of an alloy of chromium, nickel and iron.

3. A process for the production of cellulose acetate free from haze which comprises conducting the acetylation steps in the presence of a mixed catalyst, consisting of sulphuric and phosphoric acids in a container and with implements at least those parts of which that contact with the acetylating solution being constructed solely of an alloy of chromium, nickel and iron.

4. A process for the production of cellulose acetate free from haze which comprises conducting the steps of pre-treatment, acetylation, and hydrolysis in the presence of a mixed acid catalyst of sulphuric and phosphoric acids in which the latter acid is at least equal to the weight of the former, the said reactions being conducted in a container and with implements at least those parts of which that contact with the acetylating solution being composed solely of an alloy of chromium, nickel and iron.

5. A process for the production of cellulose acetate free from haze which comprises conducting the acetylating steps in a container and with implements, at least those parts of which that contact with the acetylating solution, having the approximate composition of 18% chromium, 8% nickel and 74% iron.

Signed at Rochester, New York, this 7th day of August, 1929.

CARL J. MALM.